United States Patent [19]

Hosono et al.

[11] Patent Number: 5,157,984
[45] Date of Patent: Oct. 27, 1992

[54] SEALING DEVICE OF AN AUTOMATIC TRANSMISSION

[75] Inventors: Chihiro Hosono, Okazaki; Yoichi Hayakawa, Toyoake, both of Japan

[73] Assignee: Aisin AW Co., Ltd., Japan

[21] Appl. No.: 612,701

[22] Filed: Nov. 15, 1990

[30] Foreign Application Priority Data

Nov. 15, 1989 [JP] Japan ................... 1-297164

[51] Int. Cl.⁵ ............................. F16H 57/04
[52] U.S. Cl. ...................... 74/467; 60/330; 417/321; 184/6.12
[58] Field of Search ............. 60/330; 74/467, 468; 184/6.12; 417/321

[56] References Cited

U.S. PATENT DOCUMENTS 2,865,227 12/1958 Kelley et al. .............. 184/6.12

Primary Examiner—John J. Vrablik
Assistant Examiner—Charles G. Freay
Attorney, Agent, or Firm—Lorusso & Loud

[57] ABSTRACT

A sealing device has a torque converter housing, a transmission case, an oil pump disposed between the torque converter housing and the transmission case, an oil sealing member disposed between the oil pump and the pump impeller of the torque converter, and seal ring disposed between the oil pump and the torque converter. The oil pump has a protrution extending to the torque converter. The sealing member is disposed between the outer periphery of the protrusion and a flange of the torque converter housing. The seal ring is disposed between the protrusion and the pump impeller hub.

7 Claims, 4 Drawing Sheets

SEALING DEVICE OF AN AUTOMATIC TRANSMISSION

FIELD OF THE INVENTION

The present invention relates to a sealing system of an automatic transmission for a vehicle, more specifically an oil pump sealing system disposed between a torque converter housing and a transmission case.

Usually, an oil pump is disposed between the torque converter housing and the transmission case. The oil pump transmits the engine output torque which it receives from the pump impeller hub of the torque converter and generates a line pressure in a hydraulic control device for engaging or disengaging friction engaging devices, and lubricating rotational members.

As shown in FIG. 4, an 0-ring 135 is disposed between an outer side of an oil pump body 113 and a torque converter housing 122 and an oil sealing member 133 is disposed between the circumference of an oil pump body 113 and a pump impeller hub 129 of a torque converter 50 in order to prevent a hydraulic fluid in the oil pump 110 from leaking to the torque converter 50.

However, development of the compact automatic transmission, for example as used in a front wheel front drive automatic transmission, requires not only a compactness of axial length but also that of radial length.

To reduce the radial length, it is proposed that the distance between a first rotational shaft of a transmission gear portion and a second shaft of a differential gear portion in an automatic transmission be reduced.

For the propose of solving the above mentioned problem, the oil pump shape is formed with a cross-sectional notched circle shape, as shown in FIG. 1. However, an 0-ring can't be used as a sealing device for preventing a hydraulic fluid in the oil pump from leaking, if the oil pump is formed with a notched circle shape, in cross section.

SUMMARY OF THE INVENTION

The object of the present invention is to solve the problem discussed above and to provide a sealing device for an automatic transmission of short axial length, which prevents hydraulic fluid in the oil pump from leaking.

An example of the structure of, the present invention is shown in FIG. 1.

The automatic transmission shown in FIG. 1 includes a torque converter housing having an opening portion at the center thereof, a transmission case fixed to the torque converter housing for housing an automatic transmission mechanism, an oil pump disposed between the torque converter housing and the transmission case for supplying a hydraulic fluid to the hydraulic control unit of the automatic transmission, by engine rotational force transmitted through the pump impeller hub of a torque converter, having a cylinder at the center thereof, an oil sealing member rotatably disposed between the outer periphery of the pump impeller hub and the inner periphrey of the cylinder, and a seal ring disposed between the outer periphery of the opening portion.

In the present invention, the 0-ring 135 disposed between the oil pump body 113 and torque converter housing 122 prevents a hydraulic fluid in the oil pump from leaking into the torque converter 50, thus providing a seal between the oil pump body 113 and the torque converter housing 122.

The clearance between the torque converter housing 122 and the oil pump body 113 is sealed by the axial length of the 0-ring 135 keeping both members concentric.

A groove formed in the outer periphery of the central cylinder 125 of the oil pump body 113, in which the 0-ring 135 is disposed, prevents the oil pump body 113 from changing the shape thereof which is denoted by the dotted line as shown in FIG. 3. As the result, the groove prevents hydraulic fluid in the oil pump from leaking.

The central opening portion 137 formed in a flange portion of the torque converter housing 122 extending toward the central cylinder 125 of the oil pump body 113 reduce the radial length of, the automatic transmission by reducing the thickness of the oil pump body 113.

DESCRIPTION OF THE PREFERED EMBODIMENT

An embodiment of the present invention is described in the following with the reference to the drawings.

Figure 2:
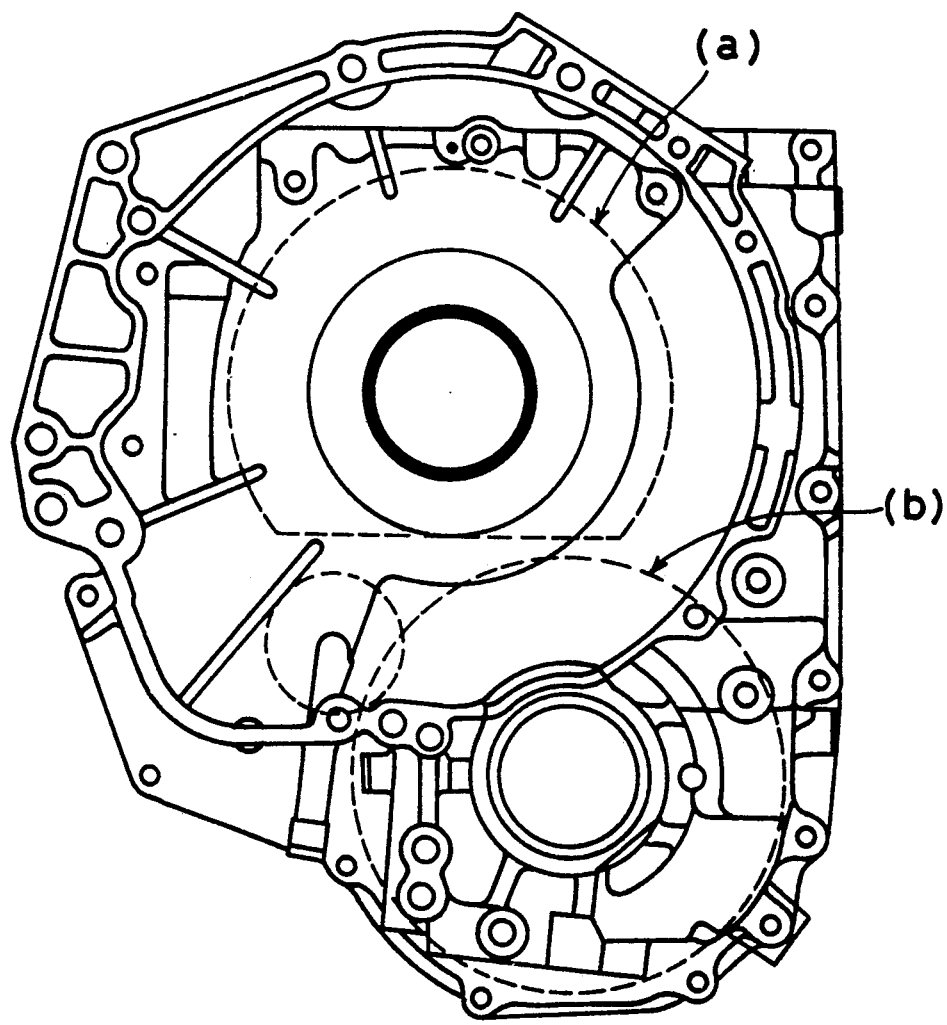
FIG. 2 is a plan view of the automatic transmission of FIG. 1.

As shown in FIG. 2, the dotted line "a" forming a notched circle is the outline of the oil pump 110 and the dotted line "b" is the outline of the differential large gear.

Figure 1:
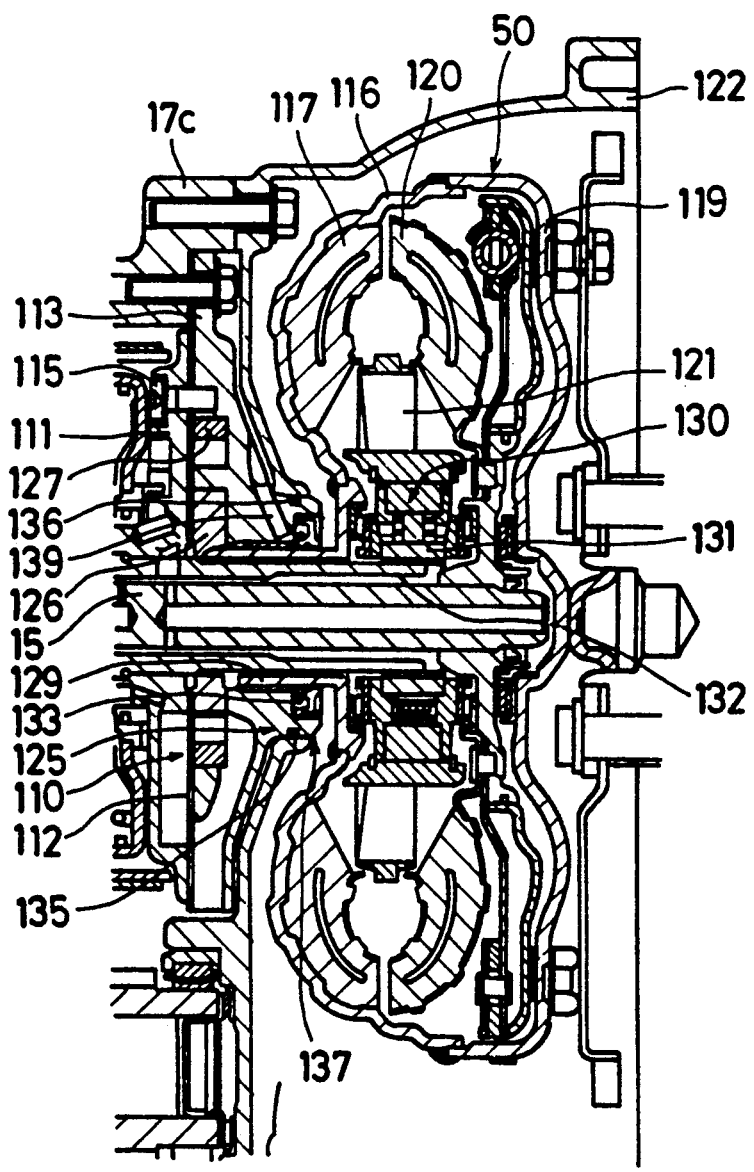
FIG. 1 is a sectional view of an automatic transmission according to the present invention.

FIG. 1 is a sectional view of an automatic transmission showing the torque converter portion and the oil pump portion. An oil pump 110 has an oil pump assembly including a pump cover 111 made of dicast aluminum, an oil pump body 113, and a pump plate 112 fixed between the pump cover 111 and the oil pump body 113 by a bolt 115 pump cover portion 111 disposed in the transmission case 17c is fixed to the case by the bolt 115.

The torque converter 50 has a torque converter casing 116 connected to an engine crank shaft (not shown in any figures), a pump impeller 117 connected to the torque converter casing 116, a turbine impeller 120 connected to an input shaft 15, a lock up clutch 119 and a stator 121 located between the two impellers 117, 120. A torque converter housing 122 is connected to the transmission case 17c at the side periphery face against the engine by bolts.

The central cylinder 125 of the oil pump body 113 is inserted in the central opening portion 137 of the torque converter housing 122 and a sun gear.

Therefore, an oil pump 110 having a gear with outer teeth 126 and a gear with inner teeth 127 is disposed between the transmission case 17c and the torque converts housing 122.

The oil pump body, has a passage 139 disposed near the central opening portion 137 and connecting a space between the pump impeller hub 129 and the oil pump body 113 to a space between the torque converter housing 122 and the oil pump body 113.

A pump impeller hub 129 extends into the oil pump body 113, which is fixed to the top portion of the torque converter case 116 and the extending portion is fixed to the inner surface of the gear with outer teeth 126 for driving the oil pump 110.

An inner race 131 of a one way clutch 130 of a stator 121 is splined to a stator shaft 132.

The stator shaft 132 is a hollow shaft made of steel.

The pump impeller hub 129 is located at the outer periphery of the stator shaft 132 and an input shaft 15 is located at the inner periphery of it.

As the result, triple shafts are disposed rotatably.

The stator shaft 132 is splined with the inner race 131 of the one way clutch 130 at one end thereof, and fixed into a central hole of the pump cover 111 at the other end therof.

The central cylinder 125 of the oil pump body 113 protrudes into the side of the torque converter 50, in contact with the pump impeller hub 129 at the inner periphery thereof, and engaged with an oil sealing member 133 at the inner periphery, near the end protrusion.

The central cylinder portion 125 of the oil pump body 113 has a groove 136 for holding an O-ring 135 at the outer peripheral surface thereof and open to the circumferential portion of the central opening 137 in the housing 122 defined by an extending flange portion of the torque converter housing 122 in contact with the O-ring 135.

Figure 3:
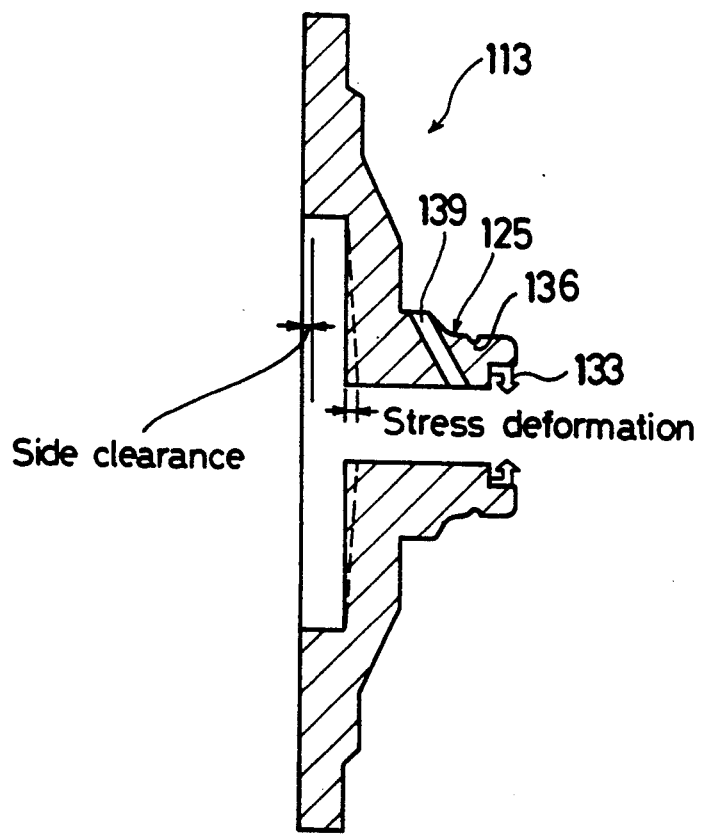
FIG. 3 is a drawing showing deformation of an oil pump body.
Figure 4:
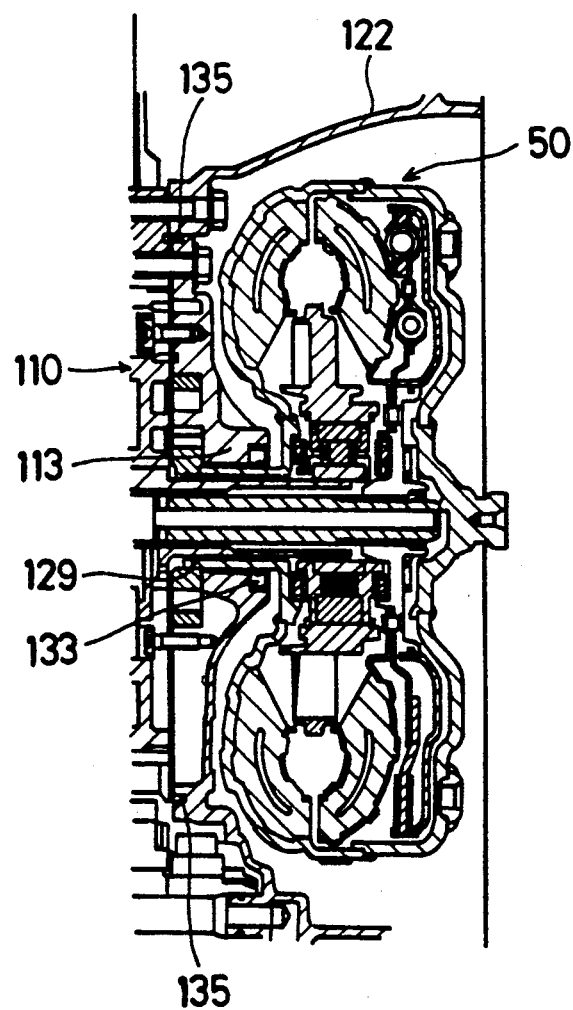
FIG. 4 is a sectional view of a prior art automatic transmission.

When a central cylinder portion 125 of a oil pump body 113 has no groove for inserting the O-ring 135, the deformation of the pump body 113, as shown in FIG. 3, results in leakage of an oil from the oil pump 110 through the clearance between the oil pump body 113 and the pump cover 111 by engaging the oil sealing member 133 into the pump body 113 at the inner periphery of the cylinder 125.

But, in the present invention, the groove 136 formed at the outer periphery of the central cylinder 125 for inserting O-ring 135, prevents the oil pump body 113 from deforming and leaking hydraulic fluid from the oil pump body 113.

A passage 139 for lubricating is formed in the central cylinder 125 of the oil pump body 113, the output port of which is near the flange portion of the torque converter housing 122 which faces the side of the oil pump 110.

Since the central opening portion of the torque converter housing 122 extends to the central cylinder 125 of the oil pump body 113, the thickness of the oil pump body 113 is thinner compared with the prior art sealing device for an oil pump 110.

Since the passage 139, for high hydraulic pressure from the oil pump 110, is formed in the central cylinder 125 of the oil pump body 113, the space for disposing the exhaust passage 139 is sufficient even if the thickness of the body 125 is thinner and the drain oil from the passage 139 will not leak to the side of the torque converter 50 because the drain oil is at the other side of the oil pump, opposite the location of the O-ring 135.

We claim:
1. An automatic transmission comprising:
a transmission housing,
a torque converter including a turbine member, a pump impeller with a hub and a torque converter housing bolted to said transmission housing, said torque converter housing having a housing axial extension and a central opening extending through said housing axial extension to define an inner cylindrical surface,
an oil pump having a flange with a peripheral portion of said flange bolted to said transmission case and a hub, said oil pump being disposed between the torque converter housing and the transmission case, for supplying a hydraulic fluid to a hydraulic control unit for the automatic transmission by engine rotational force transmitted through the hub of said pump impeller, said oil pump having a cylindrical axial extension with inner and outer surfaces, radially inward of said peripheral portion and extending into said central opening,
an oil sealing member rotatably disposed between the pump impeller hub and the inner surface of said cylindrical axial extension,
a seal ring disposed between the outer surface of said cylindrical axial extension and said inner cylindrical surface of said central opening.

2. An automatic transmission according to claim 1, said oil pump having an oil pump body and a pump cover, said oil pump body including a passage disposed near said central opening, said exhaust passage connecting space between the pump impeller hub and the oil pump body to a space between the torque converter housing and the oil pump body.

3. An automatic transmission according to claim 1, wherein said cylindrical axial extension has a groove in its outer surface for receiving the seal ring.

4. An automatic transmission according to claim 3, said oil pump having an oil pump body and a pump cover, said oil pump body including a passage disposed near said central opening, said passage connecting space between the pump impeller hub and the oil pump body to a space between the torque converter housing and the oil pump body.

5. The automatic transmission of claim 1, including a transmission input shaft and wherein said torque converter includes a stator mounted on a hollow stator shaft, said stator shaft being mounted concentrically around said transmission input shaft, said hub of said pump impeller being arranged concentrically around said stator shaft.

6. The automatic transmission of claim 5, further comprising a one-way clutch interposed between said stator and said stator shaft, said one-way clutch having an inner race splined to said stator shaft.

7. The automatic transmission of claim 1, wherein said oil sealing member is located at the distal end of said cylindrical axial extension.

* * * * *